L. M. LATTIMORE.
WAGON SEAT FASTENER.
APPLICATION FILED FEB. 15, 1910.
959,361.
Patented May 24, 1910.
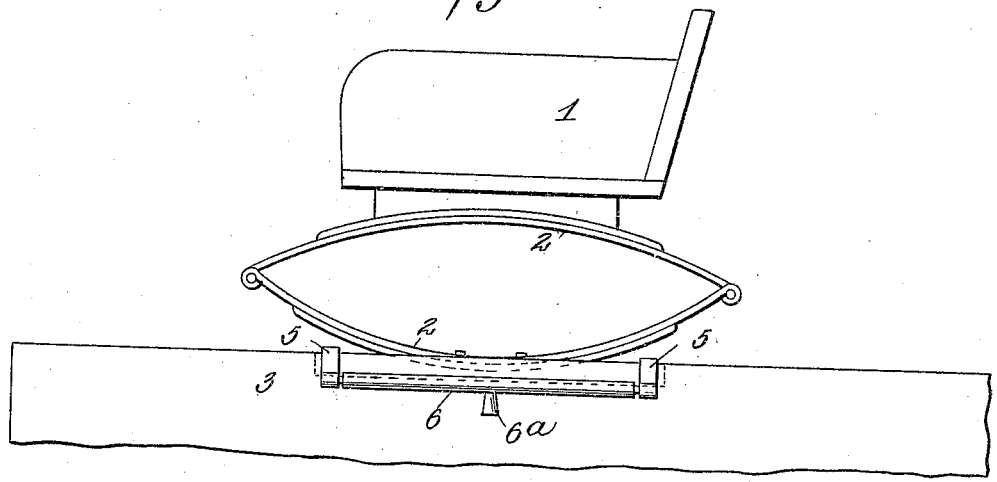
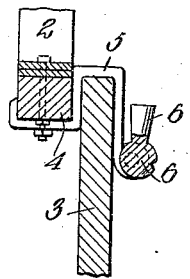 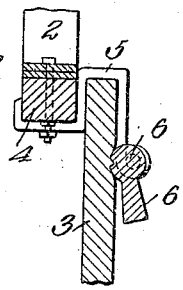 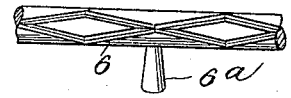
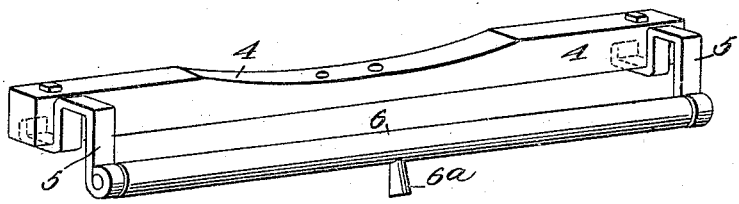
WITNESSES:
Samuel E. Wade
Amos W. Hart
INVENTOR
LEWIS M. LATTIMORE
BY Munn & Co.
ATTORNEYS

UNITED STATES PATENT OFFICE.

LEWIS M. LATTIMORE, OF SHUBERT, NEBRASKA.

WAGON-SEAT FASTENER.

959,361. Specification of Letters Patent. Patented May 24, 1910.

Application filed February 15, 1910. Serial No. 544,008.

*To all whom it may concern:*

Be it known that I, LEWIS M. LATTIMORE, a citizen of the United States, and a resident of Shubert, in the county of Richardson and State of Nebraska, have invented certain Improvements in Wagon-Seat Fasteners, of which the following is a specification.

My invention is embodied in devices adapted to support and clamp a seat detachably upon the sides of a wagon body.

The details of construction and operation of the invention are as hereinafter described and illustrated in the accompanying drawing, in which:—

Figure 1 is a side view of my invention as applied in use. Figs. 2 and 3 are vertical cross sections illustrating the application and operation of the invention. Fig. 4 is a view of the inner side of the cam roller constituting the seat-fastener proper. Fig. 5 is a perspective view of the invention, together with a bar to which a seat-spring is directly secured.

In Fig. 1, the numeral 1 indicates a wagon-seat, 2, an elliptic spring upon which it is secured, and 3, one of the sides of a wagon body. The elliptic spring 2 is supported directly upon, and secured to, a wooden bar 4—see Figs. 2, 3, and 5. The latter is in turn attached at each end to a metal hanger 5, which is constructed in angular form and adapted to embrace and rest upon the upper edge of the wagon body 3. The lower outer ends of the hangers 5 are constructed with eyes adapted to receive the journals of a cam or eccentric roller 6. Thus, the seat-bar and support 4, the metal hangers 5, and the eccentric roller 6 constitute the entire attachment with which the wagon-seat spring 2 is connected.

The roller 6 is provided centrally with a projection 6ª which serves as a handle for rotating it. The eccentric or cam portion of the roller is so located that when the handle 6ª is turned up, as in Fig. 2, the roller is out of contact with the side 3 of the wagon body; but when the handle is turned down, as in Fig. 3, the cam or eccentric portion comes into firm contact with the wagon side 3, and thus fastens the hangers 5 and thereby the wagon-seat itself firmly to the wagon body. In order to detach the seat from, or adjust it on, the wagon body, it is necessary to first turn the roller to bring its cam or eccentric portion out of contact with, or away from, the wagon side, as shown in Fig. 2. In order to adapt the roller 6 to take a firm hold on the wagon side 3, the cam or eccentric portion thereof is provided with obtuse angled grooves, as shown in Fig. 4.

What I claim is:—

1. The combination, with a wagon-seat and wagon body, of a detachable support and fastening for the former, consisting of a bar, angular metal hangers secured to its ends, the same being adapted to embrace and fit upon the upper edges of a wagon body, and a roller pivoted in the pendent outer portions of said hangers and having a cam or eccentric portion and a handle for rotating it, whereby the roller is adapted to be turned into contact with the wagon body or out of contact therewith, as required for fastening or releasing the seat, substantially as described.

2. An improved wagon-seat for the purpose specified, comprising a bar for support of a wagon-seat spring, angular metal hangers secured to the ends of said bar and having pendent outer arms provided with eyes at their extremities, and an eccentric roller journaled in said eyes and provided with a handle for rotating it, substantially as described.

LEWIS M. LATTIMORE.

Witnesses:
F. A. COLGLOZIER,
E. S. HUTCHINS.